United States Patent [19]

Oetiker

[11] Patent Number: 5,564,167
[45] Date of Patent: * Oct. 15, 1996

[54] REINFORCED EAR STRUCTURE FOR CLAMPS

[75] Inventor: Hans Oetiker, Horgen, Switzerland

[73] Assignee: Hans Oetiker AG Maschinen -und Apparatefabrik, Horgen, Switzerland

[*] Notice: The portion of the term of this patent subsequent to Feb. 1, 2014, has been disclaimed.

[21] Appl. No.: 629,716

[22] Filed: Dec. 18, 1990

Related U.S. Application Data

[63] Continuation-in-part of Ser. No. 567,085, Aug. 14, 1990, Pat. No. 5,070,580, and Ser. No. 922,408, Oct. 23, 1986, abandoned, which is a continuation of Ser. No. 622,764, Jun. 20, 1984, abandoned.

[51] Int. Cl.⁶ .................................................. F16L 33/02
[52] U.S. Cl. ........................................................ 24/20 CW
[58] Field of Search .................... 24/19, 20 R, 20 CW, 24/23 R, 20 EE, 22, 23 W

[56] References Cited

U.S. PATENT DOCUMENTS

| | | | |
|---|---|---|---|
| 3,789,463 | 2/1974 | Oetiker | 24/20 CW |
| 4,237,584 | 12/1980 | Oetiker | 24/20 CW |
| 4,299,012 | 11/1981 | Oetiker | 24/20 CW |

Primary Examiner—James R. Brittain
Attorney, Agent, or Firm—Paul M. Craig, Jr.

[57] ABSTRACT

A reinforced ear structure for a hose clamp or the like in which the reinforcement includes tab-like reinforcing members extending along the longitudinal sides of the bridging portion which are bent downwardly and/or a relatively shallow reinforcing depression in the bridging portion whose bottom part is substantially flat in a transverse cross section through the bridging portion and is either relatively flat or slightly concavely curved as viewed in longitudinal cross section through the bridging portion.

25 Claims, 1 Drawing Sheet

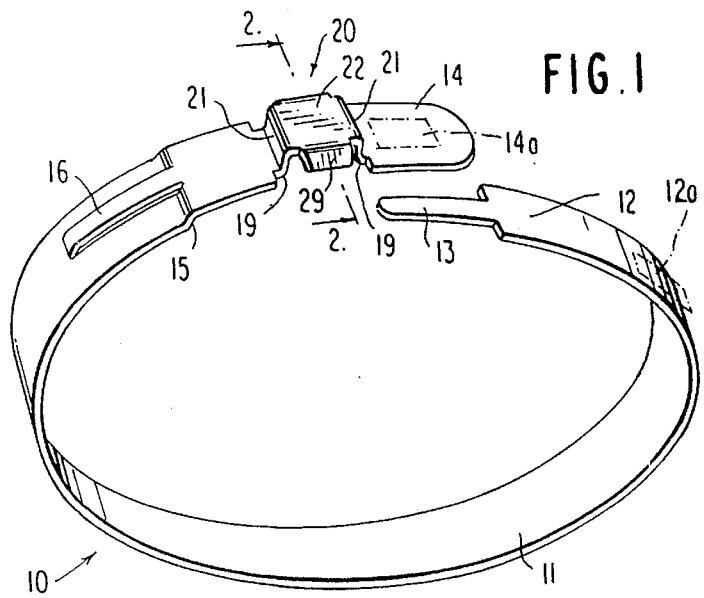
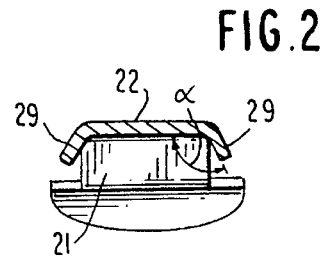
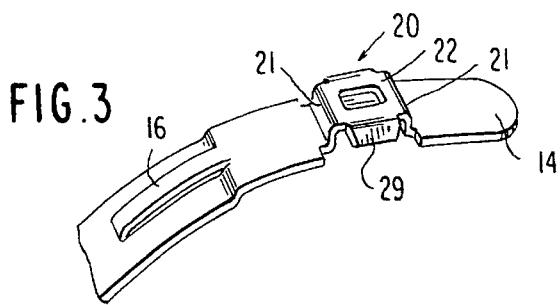
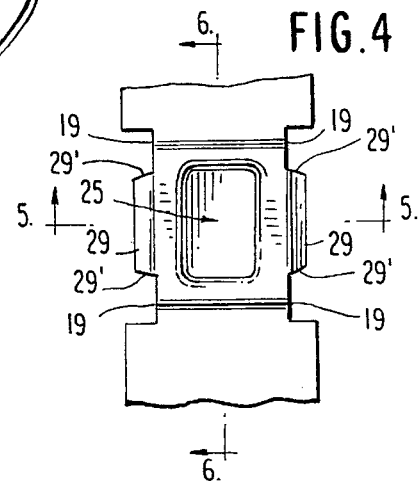
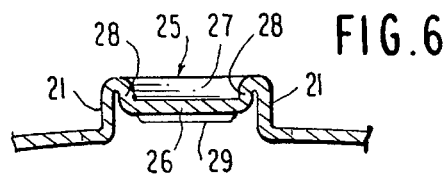
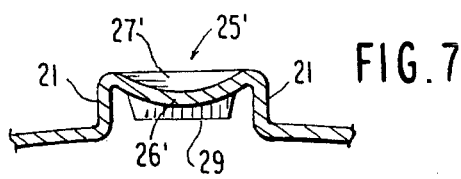
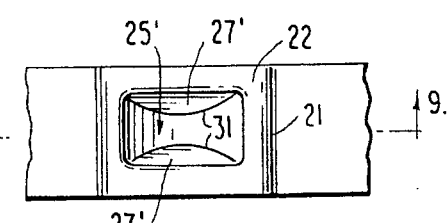
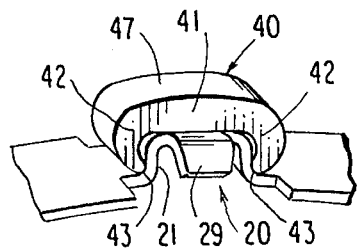
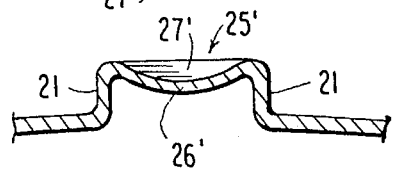

REINFORCED EAR STRUCTURE FOR CLAMPS

RELATED CASES

This application is a continuation-in-part application of my application Ser. No. 06/922,408, filed on Oct. 23, 1986, and entitled "Deformable Ear for Clamps", abandoned, which itself is a continuation application of my application Ser. No. 06/622,764, filed on Jun. 20, 1984, and entitled "Deformable Ear For Clamps", abandoned, and also a continuation-in-part application of my application Ser. No. 07/567,085, filed on Aug. 14, 1990 and entitled "Externally Strengthened Clamp Structure", U.S. Pat. No. 5,070,580.

FIELD OF THE INVENTION

The present invention relates to a plastically deformable ear structure which is strengthened to increase its holding ability and more particularly to a so-called "Oetiker" ear provided with reinforcing means to increase its holding ability.

BACKGROUND OF THE INVENTION

Deformable ears for clamp structures, which consist of two outwardly extending leg portions interconnected by a bridging portion and which are generally known as "Oetiker" ears, have been sold worldwide in very large quantities where they have enjoyed immense commercial success. These ears are used in endless one-ear or two-ear clamps, for example, as disclosed in my prior U.S. Pat. No. 2,614,304, as also in open clamps adapted to be mechanically interconnected as disclosed, for example, in my prior U.S. Pat. Nos. 2,847,742; 3,082,498 and 3,475,793. These "Oetiker" ears not only assure good holding properties but are able to compensate for thermal expansions and pressure changes to which the clamps are subjected, owing to the inherent elasticity of the plastically deformed ears. To avoid buckling of the ear during deformation when using relatively thin band material, and to increase the holding ability in the plastically deformed condition, reinforcing grooves, as disclosed in my prior U.S. Pat. No. 3,402,436 which extend in the circumferential direction of the clamp, have been used in large quantities with "Oetiker" ears during many years. The reinforcing grooves as used heretofore in the bridging portion and as described in my U.S. Pat. No. 3,402,436 consisted of a relatively narrow groove normally in the central part of the bridging portion which extended in the circumferential direction of the clamp. These prior art reinforcing grooves were of more or less V-shaped configuration as viewed in transverse cross section through the bridging portion in a plane containing the axis of the clamp structure. As viewed from above, these reinforcing grooves were more or less in the shape of a canoe or small row boat.

With the availability of new plastic materials of ever-increasing hardness, such as, "Hytrell," ever-increasing clamping forces became necessary to assure complete tightness. The holding ability of open clamp structures utilizing an "Oetiker" ear was considerably improved by the mechanical connection as disclosed in my prior U.S. Pat. No. 4,299,012 which was again further improved by the mechanical connection as disclosed in my prior U.S. Pat. No. 4,622,720. However, to fully utilize the increased strength of the improved mechanical connections, it also became necessary to provide an ear structure capable of accommodating the higher tightening forces which the improved mechanical connection could withstand. To that end, an ear structure is disclosed in my copending application Ser. No. 06/922,408, the contents of which are incorporated herein by reference in which, in lieu of a canoe-shaped narrow reinforcing groove, a depression of relatively shallow depth and of generally rectangular shape, as viewed in plan view, is provided in the bridging portion of the ear (British Patent No. 2,160,577 corresponds to this last-mentioned copending application). The reinforcing depression as disclosed in this copending application also enjoyed great commercial success.

SUMMARY OF THE INVENTION

In contrast to the prior art discussed above, the present invention provides a reinforced ear structure which, even without the presence of a reinforcing groove or reinforcing depression, offers a substantial increase in the holding ability of the ear structure. This is achieved according to the present invention in that tab-like members are provided which extend downwardly along the longitudinal sides of the bridging portion of the ear structure. These tab-like members, which are formed by bent-down lateral edge portions of the bridging portion, serve a dual purpose in the ear structure according to the present invention. On the one hand, they increase the holding ability of the ear structure. On the other, they can serve at the same time as ramp-like surfaces to lift any object that might come in contact with the ear structure during axial movement of the installed clamp, over the top surface of the ear structure. The novel ear structure involving the bent-down tab-like members can be used without additional reinforcing means in the bridging portion or with additional reinforcing means in the bridging portion in the form of grooves or depressions. In the latter case, the bent-down tab-like members provide an additional reinforcement. The depression is thereby preferably relatively shallow with its bottom part flat or of slightly concave shape, as already disclosed in this last-mentioned copending application.

If a still further reinforced ear structure is desirable, it is also possible to place a further plastically deformable strengthening member having a thickness that is a multiple of the thickness of the clamping band, over the ear structure as described herein. The strengthening member thereby preferably has the shape as disclosed in my copending application Ser. No. 07/567,085, the contents of which are incorporated herein by reference.

The ear structure according to the present invention offers the possibility of increasing the resistance of the ear structure to deformation by the use of the bent-down tab-like members which provide a considerable increase in the resistance even if no reinforcing groove or reinforcing depression is used. Furthermore, an ear structure including the bent-down tab members in conjunction with a reinforcing groove, especially in conjunction with a shallow reinforcing depression, considerably increases the tightening forces with which the clamping band can be tightened, i.e., increases the forces with which the ear structure can be deformed by plastic deformation. Furthermore, the ramp-like surfaces formed by the tab-like members prevent or at least minimize the danger of accidental movement of the installed clamp structure as a result of contact by the ear structure with an obstacle when the clamp structure, together with the part over which it is installed, are displaced or transferred in the generally axial direction of the clamp structure.

A construction of the shallow depression with a slightly concavely shaped bottom part thereby improves the reliability of deformation of the ear structure into its desired shape when, under the pressure of time, the closing tool, for example, a pneumatic pincer-like tool as used on the assembly line, is not applied in a completely correct manner. However, the relatively shallow reinforcing depression with concavely shaped bottom part provides a holding ability at least equal to that of the ear structure with flat, generally rectilinear bottom as set forth in my copending application Ser. No. 06/922,408.

The ear structure in accordance with the present invention can be used for any type of clamp, i.e., clamp structures made from tubular stock as shown in my prior U.S. Pat. No. 2,614,304 or open clamp structure as disclosed in my prior U.S. Pat. Nos. 3,475,793; 3,523,337; 4,103,399; 4,237,584 and 4,299,012.

The European Patent 0 208 598 already discloses an arrangement for a clamp structure provided with an outwardly extending circular fold in which the elasticity reserve is to be determined by a slotted sleeve surrounding the fold. However, contrary to the external strengthening member contemplated for the clamp structure in this application, this European patent is concerned with limiting the elasticity reserve in a fold of the type shown in FIG. 1 of my prior U.S. Pat. No. 3,475,793 in which folds 2 constitute tensional spring elements providing an elasticity reserve.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a perspective view of a clamp with an ear structure in accordance with the present invention;

FIG. 2 is a cross-sectional view, on an enlarged scale, taken along line 2—2 of FIG. 1;

FIG. 3 is a partial perspective view similar to FIG. 1 with an ear structure including both bent-down reinforcing tab members and a shallow reinforcing depression in the bridging portion;

FIG. 4 is a plan view, on an enlarged scale, on the ear structure of FIG. 3;

FIG. 5 is a cross-sectional view taken, along line 5—5 of FIG. 4;

FIG. 6 is a cross-sectional view, taken along line 6—6 of FIG. 4;

FIG. 7 is a cross-sectional view, similar to FIG. 6, in which the shallow depression has a slightly concavely curved bottom;

FIG. 8 is a plan view on an ear structure with a reinforcing depression as shown in FIG. 7 but without the bent-down reinforcing tab-like members;

FIG. 9 is a cross-sectional view, taken along line 9—9 of FIG. 8; and

FIG. 10 is a partial perspective view showing an ear structure with tab-like reinforcing members in accordance with the present invention with an external strengthening member to further reinforce and strengthen the ear.

DETAILED DESCRIPTION OF THE DRAWINGS

Referring now to the drawing wherein like reference numerals are used throughout the various views to designate like parts, and more particularly to FIG. 1, this figure illustrates a clamp structure generally designated by reference numeral 10 that may be, for example, of the type disclosed in my prior U.S. Pat. No. 4,299,012. However, it is understood that the ear structure of the present invention is usable with any type of clamp such as endless clamps made from tubular stock, clamps made of several assembled parts and the like. The clamp structure 10 illustrated in FIG. 1 includes a clamping band 11 having an inner band end portion 12 terminating in a tongue-like extension 13 and an outer band end portion 14 provided with a step 15 and a pressed-out channel-shaped recess 16 to receive the tongue-like extension 13 so as to provide a stepless clamp structure as disclosed in my prior U.S. Pat. No. 4,299,012. However, it is understood that a steplessness of the clamp can also be attained as disclosed in my prior U.S. Pat. No. 4,315,348. The mechanical connection between the inner band portion 12 and the outer band portion 14 takes place by conventional means as also shown, for example, in the two last-mentioned U.S. patents, by means of outwardly extending hooks schematically indicated in FIG. 1 by dash-and-dotted box 12a which engage in corresponding apertures, also schematically in FIG. 1 by dash-and-dotted box 14a.

An ear structure 20 in accordance with the present invention is located intermediate the step 15 and the free end of the outer band portion 14 a predetermined distance from the free end. The ear structure 20 consists, as is typical of so-called "Oetiker" ears of two generally outwardly extending leg portions 21 interconnected by a bridging portion 22. In the embodiment of FIGS. 1 and 2, the bridging portion 20 is without reinforcing groove or reinforcing depression. In lieu thereof, the bridging portion 22 is provided with two tab-like reinforcing members 29 bent-down at an angle $\alpha$ with respect to the bridging, portion 22. This angle $\alpha$ may be chosen at will depending on the desired ramp and strengthening effects which vary as this angle is varied and also to assure non-interference between the inwardly extending free edge of each reinforcing tab-like member and the inner band end portion 12 as the ear structure is plastically deformed. The angle $\alpha$, which is preferably between about 120° to about 140° additionally depends on the depth of the cutouts 19, i.e., on the compromise between the length of the tab-like reinforcing members 29 and the acceptable reduction of the width of the bridging portion 22 if the ear structure is to be formed from a clamping band of constant width in order to avoid material wastage. The tab-like reinforcing members 29 are delimited in the longitudinal direction of the clamping band by inwardly converging inclined surfaces 29' (FIG. 4). The downwardly bent reinforcing tab-like members 29 significantly increase the resistance offered by the ear structure to plastic deformation, i.e., significantly increase the force with which the ear structure can be closed.

In the embodiment of FIGS. 3–6, the bridging portion 22 of the ear structure 20 is provided with a reinforcement as disclosed in my copending application Ser. No. 06/922,408 and generally designated herein by reference numeral 25 which is in the shape of a relatively shallow, generally pan-shaped depression including a bottom part 26 as well as longitudinal and transverse connecting portions 27 and 28 connecting the bottom part 26 with the remaining non-depressed bridging portion 22. As can be seen from FIGS. 5 and 6, the bottom part 26 of this embodiment is relatively rectilinear in both transverse and longitudinal cross-sectional views over at least a substantially part of its length and width, preferably over substantially the entire length and width thereof.

As shown in particular in FIGS. 5 and 6, the longitudinal connecting portions 27 and the transverse connecting portions 28 extend at an angle of nearly 90° with respect to the bottom part 26 and the remaining non-depressed bridging portion 22. In a preferred embodiment, this angle differs from a 90° angle by no more than about 20°. The connecting portions 27 and 28 pass over into the bottom part 26 and into the remaining non-depressed bridging portion 22 by way of rounded-off corners of very small radii of curvature. The radii of curvature may thereby be the same or may be different from one another. Additionally, these very small radii of curvature need not be of constant length in a given corner.

The area occupied by the bottom part 26 should be at least 35% of the area occupied by a non-reinforced bridging portion, i.e., occupied by the bridging portion 22 in its non-reinforced condition as shown in FIG. 1, and preferably occupies an area between about 40% to about 60%. Additionally, the corners 22' between the remaining bridging portion 22 and the tab-like reinforcing members 29 are at most rounded-off with very small radii of curvature. By suitably choosing the length of the tab-like reinforcing members 29 and the angle α at which they are bent down, the length of the leg portions 21 can remain relatively short, i.e., decreased compared to the length used heretofore, without impairing the compensating properties of the plastically deformed ear structure in case of temperature and/or pressure changes. This is true also if relatively thicker material is used for the clamping band to further increase the tightening forces which can be applied to the ear structure during contraction of the clamp.

The embodiment of FIG. 7 differs from the embodiment of FIGS. 3–6 in that the bottom part 26' of the shallow depression 25', is of slightly concave configuration as already disclosed in my copending application Ser. No. 06/922,408. The radius of curvature of the bottom part 26' is thereby substantially greater than, preferably a multiple of the length of the leg portions 21. Though the bottom part 26' is slightly concavely curved in longitudinal cross-sectional view (FIG. 7), the bottom part 26 remains substantially rectilinear as in FIG. 5 in every axial cross-sectional plane through the bottom part. As to the rest, the shallow reinforcing depression 25' may be constructed in accordance with the disclosure of the last-mentioned copending application Ser. No. 06/922,408. For example, the longitudinal connecting portions 27' as shown in FIGS. 7 and 8 may extend at an angle of the same magnitude as disclosed in my copending application Ser. No. 06/922,408 with respect to the bottom part 26' or may also extend at a slightly larger angle, for example, of about 125° with respect to the bridging portion 22 and the bottom part 26'. The area of the shallow depression 25' of the embodiment of FIG. 7 may conform to that of the depression 25 of the embodiment of FIGS. 3–6 or may also be slightly smaller.

FIGS. 8 and 9 show an ear structure with a relatively shallow reinforcing depression 25' which differs from that of FIG. 7 only in that the ear structure is without tab-like reinforcing members 29.

The particular shape of the reinforcement 25' of FIGS. 7–9 as described herein not only provides a holding ability of the ear at least equal to that disclosed in my copending application Ser. No. 06/922,408, but also permits more reliable plastic deformation of the ear into the desired shape at the assembly line, even if, under the pressure of time, the closing tool, such as a pneumatically operated pincer-like tool, is not applied completely correctly as required for optimum deformation of the ear. This means that in practice the likelihood of improperly closed ears is greatly reduced without any loss in the holding ability of the ear structure.

FIG. 10 illustrates an ear structure which may be of the type shown in FIGS. 1, 3 or 7 in which an external strengthening member generally designated by reference numeral 40 is mounted over the ear structure 20. The strengthening member 40 includes a main portion 41 and two lateral portions 42. The two lateral portions 42, which are convexly curved, taper in the direction toward the free ends thereof which terminate in rounded-off end portions 43 having a radius of curvature preferably smaller than the radius of curvature of the transition from the clamping band 11 into the leg portions 21. The main portion 41 of the strengthening member 40 is thereby made of a thickness which is significantly greater than the thickness of the clamping band, i.e., is a multiple of the thickness of the clamping band. The thickness of the main portion 41 can thereby be made thinner or thicker depending on its required strength and the tensional forces expected in the clamping band 11. The internal surfaces of the main portion 41 are thereby substantially rectilinear, passing over into the internal surfaces of the lateral portions 42 by way of rounded-off portions of relatively small radii of curvature as more fully described in my copending application Ser. No. 07/567,085. The external surface 47 of the main portion 41 is preferably slightly convexly curved so that the maximum thickness of the main portion occurs near the middle thereof. However, the external surface 47 can also be made substantially parallel to the internal surface of the main portion 41.

A pincer-like tool whose cheeks are wider and provided with rounded-off recesses generally conforming to the convexly shaped contours of the strengthening member 40, as described in the last-mentioned copending application may thereby be used to achieve plastic deformation of such an ear structure.

As mentioned above, the ear structure in accordance with the present invention can be used with any type of clamp. If the clamp structure is of the open type, the mechanical interconnection of the overlapping band end portions may be of any known type, for example, by the use of one or more tab-like hook members, by the use of a rivet-like connection as described in my U.S. Pat. No. 3,082,498 or by the simultaneous use of both guide and support hooks as disclosed in my U.S. Pat. No. 4,299,012 or by the use of a combined guide and support hook with or without additional support hooks as disclosed in my U.S. Pat. No. 4,622,720.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A reinforced ear structure for use in a clamp whose clamping band is intended to be contracted by relatively large tightening forces, which includes two outwardly extending leg portions and a bridging portion connecting said leg portions and provided with reinforcing means, characterized in that the reinforcing means includes downwardly bent tab-like members along the longitudinal edges of the bridging portion, the length of the tab-like reinforcing members and the angle between the bridging portion and the tab-like members being such that the projection of the length of the tab-like members is at most equal to the length of the leg portions as viewed in a direction parallel to the leg portions and the bridging portion.

2. A reinforced ear structure formed from band material according to claim 1, characterized in that the bridging portion has a width which is smaller than the width of the band material by an amount twice the length of a tab-like member.

3. A reinforced ear structure according to claim 2, characterized in that cutouts are formed in the band laterally within the area of each leg portion on both sides of the clamping band which substantially define the width of the bridging portion and the shape of the tab-like reinforcing members.

4. A reinforced ear structure according to claim 3, wherein the cutouts are of such shape that each tab-like member is delimited in the longitudinal direction of the clamping band by end surfaces converging toward one another.

5. A reinforced ear structure with a substantially planar bridging portion according to claim 4, characterized in that the tab-like reinforcing members are bent relative to the plane of the bridging portion in such a manner that transition portions having at most very small radii of curvature are formed.

6. A reinforced ear structure according to claim 1, characterized in that the bridging portion is devoid of any reinforcing means other than the tab-like means.

7. A reinforced ear structure according to claim 1, characterized in that the reinforcing means further includes a reinforcing groove extending in the longitudinal direction of the clamping band.

8. A reinforced ear structure according to claim 1, characterized in that the reinforcing means includes a shallow depression means in the bridging portion which has length in both the longitudinal and transverse directions of the clamp.

9. A reinforced ear structure according to claim 8, characterized in that the area of said depression means is surrounded by a remaining non-reinforced bridging portion and is at least about 35% of the area of the bridging portion in its non-reinforced condition which substantially corresponds to the sum of the area of the depression means and of the remaining non-reinforced bridging portion.

10. A reinforced ear structure according to claim 8, in which the depression means is surrounded by a remaining non-reinforced bridging portion, characterized in that the bottom part of said depression means and the remaining non-reinforced bridging portion are connected by way of generally longitudinally extending connecting portions.

11. A reinforced ear structure according to claim 10, characterized in that transition portions between the longitudinally extending connecting portions and the remaining non-depressed bridging portion involve corners having at most very small radii of curvature.

12. A reinforced ear structure according to claim 8, characterized in that the bottom part of said depression means is substantially flat in cross sections transverse to the clamp longitudinal direction which extend through the ear structure.

13. A reinforced ear structure according to claim 12, characterized in that the bottom part is also substantially flat as viewed in longitudinal cross section and in that transverse connecting portions connecting the bridging portion with the bottom part form transition portions of at most very small radii of curvature.

14. A reinforced ear structure according to claim 8, characterized in that the bottom part is slightly concavely curved as viewed in longitudinal cross section of the clamping band with the radius of curvature substantially greater than the length of the leg portions.

15. A reinforced ear structure according to claim 8, characterized by an external strengthening member adapted to be mounted externally over the ear structure which has a thickness that is a multiple of the thickness of the clamping band.

16. A reinforced ear structure according to claim 15, characterized in that the external strengthening member surrounds the ear structure over the bridging portion and the leg portions, and in that the external strengthening member has a thick main portion extending approximately parallel to the bridging portion with the main portion terminating in lateral portions, the free ends of which come to lie within the area of transition between the clamping band and the leg portions.

17. A reinforced ear structure according to claim 16, characterized in that the lateral portions of the external strengthening member taper in a direction toward the free ends thereof, in that the lateral portions are convexly curved, and in that the outer surface of the main portion is slightly convexly curved while the inner surface thereof is substantially rectilinear.

18. A reinforced ear structure according to claim 17, characterized in that the inner surface of the main portion is longer than the outer surface of the bridging portion and in that in the non-deformed condition the lateral portions of the external strengthening member are spaced from the leg portions up to the area of the free ends thereof, in that the inner surface of the main portion of the external strengthening member passes over into the inner surface of the lateral portions by way of small radii of curvature, and in that the free ends of the lateral portions are rounded-off with a radius of curvature smaller than the radius of curvature defining the transition areas.

19. A clamp structure with a reinforced ear structure according to claim 8, characterized in that the reinforced ear structure is formed integral with the clamping band.

20. A clamp structure according to claim 19, characterized in that the clamp structure is of the open clamp structure type, whose overlapping open end portions of the clamping band are mechanically interconnected, and in that further means are provided in the overlapping band end portions of the clamping band to avoid any step, gap or offset in the internal surface of the clamp structure including a tongue-like extension at the free end of the inner band portion adapted to engage in a tongue-receiving means provided within the area of a step in the outer band portion spaced from the ear-like structure a predetermined distance.

21. A clamp structure according to claim 20, characterized in that the tongue-receiving means is a centrally disposed, outwardly extending channel commencing within the area of the step.

22. A clamp structure with a reinforced ear structure according to claim 1, characterized in that the reinforced ear structure is formed integral with the clamping band.

23. A reinforced ear structure for use in a clamp whose clamping band is intended to be contracted by relatively large tightening forces, which includes two outwardly extending leg portions and a bridging portion connecting said leg portions and provided with reinforcing means surrounded by a remaining non-reinforced bridging portion, characterized in that the reinforcing means includes a shallow depression means in the bridging portion which is of generally rectangular shape, as viewed in plan view, whose mutually opposite sides are substantially rectilinear, extend generally in the longitudinal and transverse directions of the clamping band, respectively, and are substantially parallel to one another so that the area of the depression means substantially corresponds to the product of length and width of the depression means, and in that the sides of the depression means are of such length that the area of said depression means formed by said product is at least about 35% of the total area of the bridging portion in its non-reinforced condition, which substantially corresponds to the sum of the areas of the depression means and of the non-reinforced remaining bridging portion.

24. A reinforced ear structure according to claim 23, characterized in that the depression means has a bottom part that is substantially flat in axial cross sections transverse to the clamp longitudinal direction which extend through the depression means in the bridging portion.

25. A reinforced ear structure according to claim 24, characterized in that the bottom part is substantially flat in longitudinal cross section through the depression means.

* * * * *